United States Patent [19]
Kondo et al.

[11] 3,926,728
[45] Dec. 16, 1975

[54] NEW PROCESS FOR THE PREPARATION OF 6-AMINOPENICILLANIC ACID

[75] Inventors: Eiji Kondo, Ikeda; Takashi Mitsugi, Takaishi, both of Japan

[73] Assignee: Shionogi & Co., Ltd., Osaka, Japan

[22] Filed: Aug. 19, 1974

[21] Appl. No.: 498,540

[30] Foreign Application Priority Data
Sept. 3, 1973  Japan.......................... 48-99106[U]

[52] U.S. Cl. ............................................... 195/36 P
[51] Int. Cl.² ........................................... C12D 9/22
[58] Field of Search ................................... 195/36 P

[56] References Cited
UNITED STATES PATENTS
3,212,995  10/1965  Huang et al. ..................... 195/36 P

*Primary Examiner*—Alvin E. Tanenholtz
*Attorney, Agent, or Firm*—Wenderoth, Lind & Ponack

[57] ABSTRACT

A useful intermediate, 6-Aminopenicillanic acid or its salt is prepared by the action of a fungus belonging to the genus Phialomyces, Leptosphaerulina, or Robillarda, or its mycelium preparation on a penicillin or its salt.

11 Claims, No Drawings

NEW PROCESS FOR THE PREPARATION OF 6-AMINOPENICILLANIC ACID

This invention relates to a process for the preparation of 6-aminopenicillanic acid or its salt, well-known starting material for the synthesis of synthetic penicillins and cephalosporins, from a penicillin or its salt by the action of a penicillin amidase-producing fungus belonging to the genus *Phialomyces, Leptosphaerulina,* or *Robillarda,* or its mycelium preparation.

According to the process of this invention, a penicillin or its salt is subjected to the action of a fungus belonging to genus *Phialomyces, Leptosphaerulina,* or *Robillarda,* or its mycelium preparations and the produced 6-aminopenicillanic acid or its salt is separated and isolated in a crude or pure state.

The said penicillin utilizable as a substrate for this invention can be penicillin G, penicillin V, or like penicillins.

The salt can be a water-soluble salt (e.g. alkali metal salts including sodium, potassium or optionally alkylated ammonium salts) which does not interfere with the reaction of this invention.

The fungus for the preparation of 6-aminopenicillanic acid or its salt from a penicillin or its salt belongs to the genus *Phialomyces, Leptosphaerulina,* or *Robillarda.* Specific fungi possessing the said penicillin-amidase activity are exemplified by the following fungi of Eumycetes:

1. *Phialomyces macrosporus* Mista and Talbot MFC-2057 has been isolated from a soil sample collected at Kumamoto city, Kumamota Prefecture, Japan on July in 1969, and shows the following morphological characteristics. On corn meal agar: Colonies spreading, minute powdery, black. Phialophores unbranched, 800 to 1600 microns in length and 5 to 8 microns wide, colorless to light-colored, terminating in small fascicles of 1 to 5 (mainly 3 to 4) phialides. Conidia bottle-shaped, colorless, 20 to 40 by 8.5 to 12 microns. Phialospores fusiform, 24 to 37 by 18 to 22 microns, rough in surface, dark brown, forming long chain. It is apparent that on the basis of the said morphological characteristics, this strain is very similar to *Phialomyces macrosporus* Mista and Talbot described in the literature of Mista, P. C. and Talbot, P. H. B.; Canadian J. Bot., 42, page 1287 (1964). Therefore, it is concluded that this strain and *Phialomyces macrosporus* Mista and Talbot are of the same species, and the strain has been designated *Phialomyces macrosporus* Mista and Talbot MFC-2507. This strain has been deposited with the American Type Culture Collection under the accession number ATCC 20377;

2. *Leptosphaerulina australis* McAlpine MFC-2941 has been isolated from a forest soil sample collected at Honiara in Guadalcanal Island on January in 1970, and shows the following morphological characteristics. On potato-sucrose agar: Colonies spreading, dark brown, felt-like, not formed asci. On corn meal agar: Perithecia formed, pear shaped, dark brown, occuring solitary. Asci oblong, bitunicate, including 8 ascospores. Ascospores ellipsoidal, 27.5 to 35 by 12 to 14 microns. It is apparent that on the basis of the said morphological characteristics, this strain is very similar to *Leptosphaerulina australis* McAlpine described in the literature of Rao, P. N. and Karan, D.: Mycopath. Mycol. Appl., 22, page 93 (1964). Therefore, it is concluded that this strain and *Leptosphaerulina australis* McAlpine are of the same species, and the strain of the invention has been designated *Leptosphaerulina australis* McAlpine MFC-2941. This strain has been deposited with the American Type Culture Collection under accession number ATCC 20378;

3. *Robillarda sp.* MFC-4408 has been isolated from a soil sample collected in Kagoshima Prefecture, Japan, and shows the following morphological characteristics. On oat meal agar: Colonies spreading, felt-like, pale grey, forming many dark brown granules (pycnidia) with ageing. Pycnidia occuring solitary or in groups, dark brown. Phialides cylindrical colorless, forming densely in inner surface of pycnidia. Conidia oblong, forming septum in middle, 9 to 16 by 2.5 to 3 microns, slightly dark, with 3 appendages (16 to 24 microns in length) at the apex. It is apparent that on the basis of the said morphological characteristics this strain belongs to the genus *Robillarda*. However, the species has not yet been elucidated. This strain has been deposited with the American Type Culture Collection under accession number ATCC 20379; and 4. Other species of the said genera, possessing the said penicillin amidase activity.

The use of natural or artificial mutants or variants belonging to the said genera and possessing the said penicillin amidase activity is also included in the scope of this invention. The artificial mutants can be produced by such conventional methods as X-ray irradiation, ultra-violet irradiation, chemical mutation (e.g. with nitrogen mustard), and the like.

The fungi can be inoculated and propagated in a natural or artificial nutrient medium suitable for the propagation of the fungi. Representative media contain the following ingredients: such nitrogen or carbon sources as a carbohydrate (e.g. glucose, fructose, maltose, sucrose, starch, starch hydrolyzate, sorbitol, honey, potato powder, flour), bouillon, yeast extract, peptone, corn steep liquor, fish meal, fish meal extract, casein hydrolyzate, soy bean meal, casamino acid, rice bran extract, urea, ammonia, ammonium salt (e.g. chloride, sulfate, nitrate, acetate, phosphate), organic acid (e.g. acetic acid, lactic acid), and like sources; inorganic salts (e.g. magnesium sulfate, sodium phosphate, iron sulfate, manganese chloride, copper chloride, zinc chloride); and/or other materials necessary or preferable for the growth of fungi (e.g. fungal vitamine, amino acid). The propagation is carried out preferably under aerobic condition (e.g. by shaking or static culture, culture under aeration or stirring), and preferably at pH 5 to 9, at 20°C to 40°C, for 1 to 5 days to give the desired mycelia or propagated fungi. The propagation can be carried out in the presence of a penicillin for induction of the penicillin amidase.

The action of a fungus belonging to said genera on the penicillin or its salt is effected by contacting the penicillin or its salt in a form of powder, suspension, or solution in an aqueous or hydrophilic organic solvent with the fungus or its mycelium preparation in aqueous medium.

The fungus (mycelium) is obtained by filtering or centrifuging the propagated broth followed by washing the solid material with water or buffer solution to remove nutrient solution and other contaminants. If necessary, the fungus can be dried with a water soluble organic solvent (e.g. acetone, ethanol).

The said mycelium preparation is that which is available for utilization of the penicillin-amidase activity of the intra- or extra-cellular enzyme system of the fungi. The preparation can be, for example, in a form of propagated culture broth, mycelia or fungi, culture broth from which the fungi are removed, or enzyme solution. The enzyme solution includes a crude enzyme solution containing homogenate of mycelium obtained by homogenating said fungi; crude or purified enzyme obtained by a conventional method in the art from the said mycelium homogenate [by e.g. salting out (with e.g. ammonium sulfate), dialysis, precipitation (with e.g. acetone, ethanol), chromatography, gel filtration, centrifugation, electrophoresis, and like methods]; and a fungus or crude or purified enzyme combined with solid material (e.g. cephadex, DEAE-cellulose, celite, active charcoal, acrylic resin, ion-exchange resin) to form a solid enzyme preparation.

The hydrophilic organic solvent (e.g. alcohol, acetone) is used at a concentration at which it does not inhibit the action of said penicillin amidase. The aqueous medium includes a buffer solution, salt solution, a nutrient medium used for propagation, distilled water, and like medium. Aerobic condition is not essential, but preferable. Shaking and stirring are preferable. Preferable conditions are pH 5 to 8, at 20°C to 40°C, for 5 to 80 hours, although the values vary depending on the concentration and sort of the penicillin or its salt, sort of fungus, procedure for the treatment, and other conditions. If necessary, acid, base, or buffer solution can be added when the pH of the medium changes during reaction. Preferable concentration of the starting penicillin is 0.1 to 20%, more preferably 0.1 to 10%.

Isolation and purification of the produced 6-aminopenicillanic acid or its salt can be effected by a conventional method in the art [e.g. removing the fungi, mycelium preparation or insoluble material from the reaction mixture (by means of e.g. filtration, centrifugation, absorption, denaturation, etc., or the combination of these); followed by isolation (by means of e.g. absorption, fractional extraction, concentration, separation, precipitation, or other methods); and by purification (by means of e.g. recrystallization, absorption, chromatography, ion-exchange, or other conventional methods in the art)]. The product, 6-aminopenicillanic acid, can be isolated as a salt at the carboxy group (e.g. sodium, potassium, magnesium, amine salts); or as a salt at the produced amino group (e.g. p-toluenesulfonate, rhodanate, hydrochloride, sulfate).

In this specification, MFC for the strain numbers denotes the collection numbers of the Shionogi Research Laboratory.

The following examples represent presently preferred embodiments of this invention, but it is to be understood that the examples are given by way of illustration only and not of limitation.

EXAMPLE 1.

(1) *Phialomyces macrosporus* MFC-2057 is inoculated in a sterilized nutrient medium (100 ml) consisting of an aqueous solution (pH 7.0) containing glucose (3.5 %), peptone (2.0 %), and corn steep liquor (0.3 %), and cultured with shaking at 28°C for 3 days. The broth is filtered to give mycelia, which are washed with de-ionized water.

(2) The mycelia (ca. 6.7 g) are suspended in de-ionated water (100 ml) containing penicillin V potassium salt (0.2 g), and the suspension is shaken for 2 days. The suspension is filtered to remove the mycelia, acidified with 4N-sulfuric acid to pH 2.0, and washed twice with butyl acetate (100 ml). To the aqueous layer is added barium hydroxide to pH 7.0, centrifuged to give a supernatant, which is concentrated to 7 ml. The residual solution is diluted with methanol (14 ml), and the formed precipitate is removed by filtration. The filtrate is concentrated to 3 ml, adjusted to pH 4.3 with 6N-hydrochloric acid, and kept at 4°C overnight. Collection of the formed crystals by filtration, washing with water, and drying give 6-aminopenicillanic acid (0.062 g). m.p. 202° – 205°C (decomp.). IR:$\nu_{max}^{Nujol}$ 1771,1623,1411,1337,1254,767 cm$^{-1}$. Elemental analyses of the product are in good agreement with the values calculated for $C_8H_{12}N_2SO_3$. Yield: 56 %.

EXAMPLES 2 to 12.

In a procedure similar to that in Example 1, a fungus (A) is inoculated in a sterilized nutrient medium (100 ml) consisting of an aqueous solution (pH 7.0) containing glucose (3.5 %), peptone (2.0 %), and corn steep liquor (0.3 %), and cultured with shaking (for B days) at 28°C to obtain a propagated broth. The broth is filtered to collect mycelia (C g) which is washed with de-ionated water.

The mycelia is suspended in a reaction medium (D; E ml) containing penicillin V potassium salt (F g), and shaken (for G hours) at 28°C. Aqueous filtrate obtained by removing the mycelia from the reaction mixture is assayed for 6-aminopenicillanic acid (H g/100 ml) by the method of G. E. Boxer et al. (Anal. Chem., 21, 670 (1949)). Yield: (K %).

When a broth is used as the reaction medium, penicillin V potassium salt (F g) is added to the propagated broth (A ml) and cultured with shaking (for G hours) at 28°C. Aqueous filtrate obtained by removing mycelium from the broth is assayed for 6-aminopenicillanic acid (H g/100 ml) by the method of G. E. Boxer et al. Yield: (K %).

The results are shown in the following Table.

TABLE I

| Example No. | Fungus (A) | Shaking time (B days) | Mycelium crop (C g) | Reaction medium (D) | Reaction medium (E ml) | Penicillin VK-salt (F g) | Reaction time (G hrs) | 6-Aminopenicillanic acid Crop (H mg) | Yield (K %) |
|---|---|---|---|---|---|---|---|---|---|
| 2 | *Phialomyces macrosporus* MFC-2057 | 3 | 6.7 | PhBu | 100 | 0.3 | 48 | 0.12 | 72 |
| 3 | do. | 3* | 6.0 | H$_2$O | 100 | 0.2 | 40 | 0.07 | 60 |
| 4 | do. | 3 | — | broth | — | 0.2 | 48 | 0.10 | 60 |
| 5 | *Leptosphaerulina australis* MFC-2941 | 5 | 3.1 | H$_2$O | 100 | 0.3 | 48 | 0.11 | 67 |
| 6 | do. | 5 | 3.1 | PhBu | 100 | 0.3 | 48 | 0.10 | 60 |

TABLE I-continued

| Example No. | Fungus (A) | Shaking time (B days) | Mycelium crop (C g) | Reaction medium (D) | Reaction medium (E ml) | Penicillin VK-salt (F g) | Reaction time (G hrs) | 6-Aminopenicillanic acid Crop (H mg) | 6-Aminopenicillanic acid Yield (K %) |
|---|---|---|---|---|---|---|---|---|---|
| 7 | do. | 5* | 3.0 | $H_2O$ | 100 | 0.3 | 48 | 0.12 | 71 |
| 8 | do. | 5 | — | broth | — | 0.3 | 48 | 0.12 | 71 |
| 9 | Robillarda sp. MFC–4408 | 3 | 5.6 | $H_2O$ | 100 | 0.3 | 48 | 0.15 | 89 |
| 10 | do. | 3 | 5.6 | PhBu | 100 | 0.5 | 48 | 0.21 | 75 |
| 11 | do. | 3* | 5.0 | $H_2O$ | 100 | 0.3 | 36 | 0.14 | 84 |
| 12 | do. | 3 | — | broth | — | 0.5 | 72 | 0.19 | 68 |

*Propagated in the presence of penicillin V potassium salt (0.01 % in the nutrient medium) for induction.
Abbreviations—$H_2O$: de-ionated water; PhBu: M/30 phosphate buffer (pH 7.0)

What we claim is:

1. A process for preparing 6-aminopenicillanic acid or a salt thereof which comprises (A) subjecting a penicillin or salt thereof to the penicillin amidase action of (1) a penicillin amidase-producing fungus of the genus *Phialomyces*, the genus *Leptosphaerulina* or the genus *Robillarda* or (2) the mycelium preparation resulting from said fungus, and (B) isolating the resultant 6-aminopenicillanic acid or salt thereof.

2. A process according to claim 1, wherein step A is carried out at a pH in the range from 5 to 8.

3. A process according to claim 1, wherein step A is carried out at a temperature in the range from 20°C to 40°C.

4. A process according to claim 1, wherein step A is carried out in an aqueous medium selected from the group consisting of de-ionated water, phosphate buffer and cultured broth.

5. A process according to claim 4, wherein the concentration of the penicillin or salt thereof in the aqueous medium prior to step A is in the range from 0.1 % to 10 %.

6. A process according to claim 1, wherein penicillin V is subjected to step A.

7. A process according to claim 1, wherein an alkali metal salt of penicillin V is subjected to step A.

8. A process according to claim 1, wherein the mycelium preparation is washed mycelia, and said washed mycelia is employed in step A.

9. A process according to claim 1, wherein the fungus is *Phialomyces macrosporus* ATCC 20377.

10. A process according to claim 1, wherein the fungus is *Leptosphaerulina australis* ATCC 20378.

11. A process according to claim 1, wherein the fungus is *Robillarda sp.* ATCC 20379.

* * * * *